July 9, 1957          C. H. BERGQUIST          2,798,509
       METALLIZED-GALVANIZED ELECTRICAL CONDUIT
              AND METHOD OF MAKING SAME
Filed May 27, 1954                        2 Sheets-Sheet 1
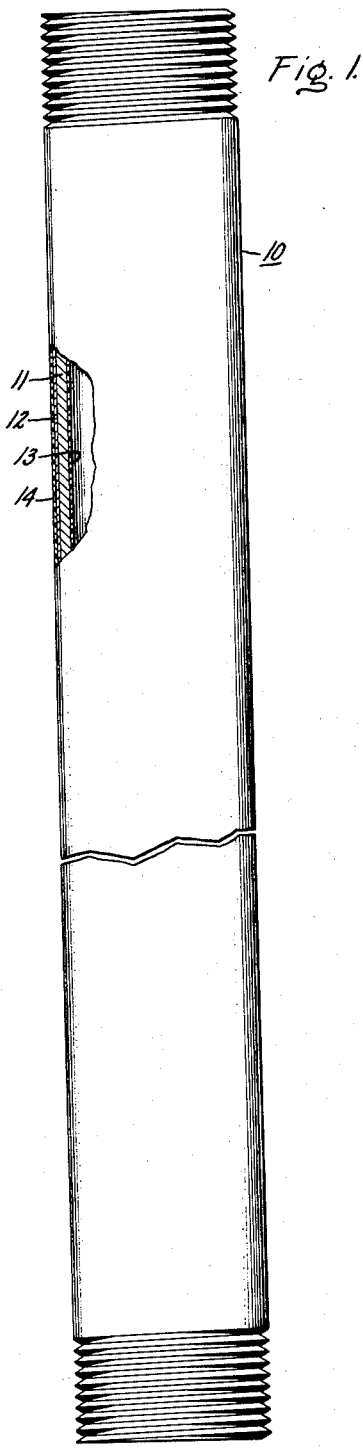
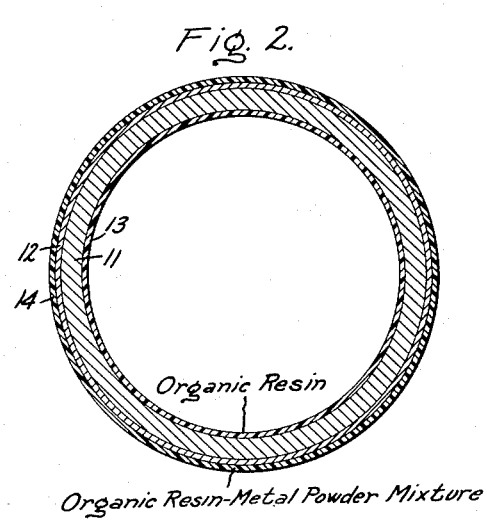
Inventor:
Carl H. Bergquist,
by Allard A. Braddock
His Attorney.

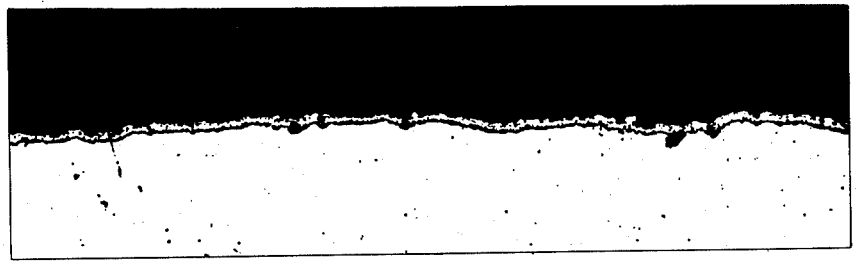
Sheradized   Fig. 3.
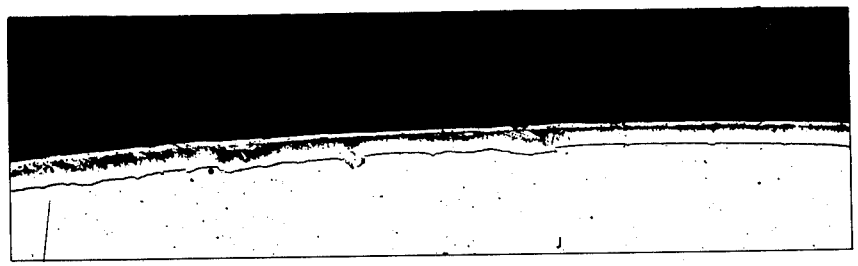
Hot-Dipped   Fig. 4.
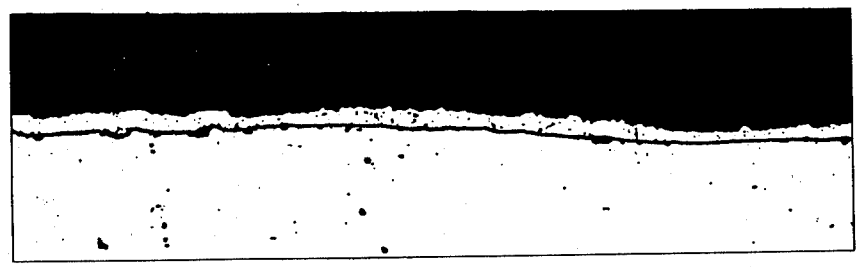
Electroplated   Fig. 5.
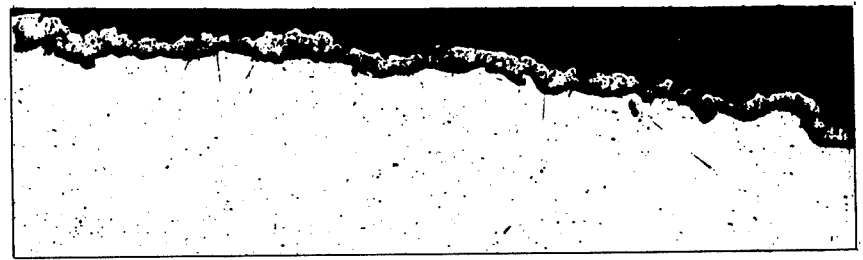
Metallized   Fig. 6.
Inventor:
Carl H. Bergquist,
by Allard A. Braddock
His Attorney.

United States Patent Office 2,798,509
Patented July 9, 1957

2,798,509

METALLIZED-GALVANIZED ELECTRICAL CONDUIT AND METHOD OF MAKING SAME

Carl H. Bergquist, Bridgeport, Conn., assignor to General Electric Company, a corporation of New York Application May 27, 1954, Serial No. 432,855

3 Claims. (Cl. 138—68)

The present invention relates to rigid electrical conduit which is commonly used for electrical wiring systems in building constructions, and to the method of providing corrosion-resistant finishes for said conduit. Conduit is similar in over-all appearance to water pipe and it is adapated to be buried in the floors or walls or to be surface mounted on the walls or ceilings. The conduit is first permanently installed in the building and the wires are pulled in later so that electrical connections may be made with the wiring devices located throughout the building in order to complete the electrical circuits.

Electrical conduit differs from water pipe in several important respects. Conduit is much softer so that it bends easily; it is carefully inspected to make sure that the inner surface is entirely smooth to prevent damage to the wires as they are pulled into the conduits; and it has a corrosion-resistant finish both inside and outside. The exterior finish may be either galvanized or black enamel, but the galvanized finish is by far the best for most applications and has generally become the commonly used type of conduit.

The electrical conduit of the present invention is a galvanized conduit having an exterior zinc coating applied by a metal-spraying process which will hereinafter be referred to as a metallizing process. This conduit is frequently exposed to severe corrosive influences; therefore, the exterior zinc coating is of primary importance in the protection of the steel pipe under active corrosive conditions. The metallizing process which is practiced in the present invention consists in projecting onto the conduit small particles of the zinc that is to ultimately form the exterior finish of the conduit as will hereinafter be more particularly described and claimed. The zinc in the form of a fine graded powder ranging from 100 to 325 mesh sizes and under (U. S. Standard Sieve Series) is drawn by the evacuation of air to a specially constructed spraying booth where it is heated by passing through the flame of one of several guns which project the melted metal in an atomized spray against the conduit. To secure tight adhesion, the surface of the conduit is initially cleaned by pickling and then prepared for the zinc coating by blasting with a steel grit.

In order to contribute to the ease of threading this conduit the zinc surface is coated with a protective resin coating having minute particles of a corrosion-resistant metal suspended therein. This coating, and particularly the suspended metal powder, will cooperate with the zinc surface to increase the ease of thread cutting as well as protect the zinc against water stain, marking and to provide added protection for the zinc against those conditions detrimental to pure zinc alone.

The metallizing process coats only the exterior surface of the conduit with zinc while leaving the interior surface unprotected. Therefore, in addition a corrosion-resistant interior coating of resin is applied to the conduit so as to provide the conduit with a smooth interior surface that minimizes friction between the wire and the conduit as the wires are being pulled into the system.

The principal object of this invention is to provide an electrical rigid conduit with a high quality corrosion protection.

A further object is to provide an electrical conduit with a metallized zinc exterior surface which is covered by an organic resin containing metal powder that will cooperate with the zinc to act as an ideal cutting lubricant and make threading of the conduit at the installation site easier.

A further object is to provide an electrical conduit with a metallized zinc exterior surface coated with an organic resin which will help to produce cleaner threads and increase the life of the thread-cutting tools.

A further object is to produce an electrical conduit by using a metallizing process so that the conduit is more ductile than conduit made by the other known methods, and therefore is easier to bend.

A further object is to provide an electrical conduit with a corrosion-resistant interior protective coating of resin that minimizes friction between the wires and the conduit as the wires are being pulled into the system.

My invention will be better understood from the following description taken in connection with the accompanying drawing and its scope will be pointed out in the appended claims.

In the drawing:

Figure 1 is a partial sectional view of a length of electrical conduit embodying my invention.

Figure 2 is a cross-sectional view on an enlarged scale of the conduit of Figure 1.

Figures 3 through 6 represent photomicrographs of four types of zinc coated steel conduit.

Figure 3 illustrates sherardized conduit.

Figure 4 illustrates hot-dipped conduit.

Figure 5 illustrates electroplated conduit.

Figure 6 illustrates metallized conduit.

Referring in detail to the drawing 10 represents a length of electrical conduit made according to the teachings of the present invention. The base material 11 of the conduit is generally Open Hearth steel for hand bending sizes and Bessemer steel for the larger sizes. The steel pipe 11 is delivered from the steel mill in approximately 20-ft. lengths. The first operation in processing the pipe for electrical conduit is to cut the pipe into 10-ft. lengths. Then the ends of the pipe or conduit are reamed and the out side edge is chamfered to remove burrs and sharp edges which might later damage the wire to be installed in the conduit. The conduit in large batches is next cleaned or pickled by revolving and tumbling through a hot dilute sulfuric acid solution to clean the inside and outside of the pipe of any scale, oxides and other detrimental substances, after which it is thoroughly rinsed with both hot and cold water, and then dried with compressed air.

The conduit is now about ready to be coated with the zinc powder by a metallizing process. In order to secure tight adhesion between the zinc and the steel, the outer surface of the conduit is blasted with crushed steel grit to roughen the surface to the proper finish as well as to completely clean the steel and remove the hard skin produced during its fabrication and during the tumbling of the conduit in the pickling operation. As will be seen later, the complete removal of this skin helps to increase the ease of bending of the conduit. After the grit blasting operation, the conduit is longitudinally fed into the zinc spraying booth either singly or in pairs by a series of gear driven rollers which rotate the conduit as it moves through the booth.

The spraying apparatus comprises a small booth or chamber having an exhaust system for carrying off and reclaiming any undeposited zinc powder in the atmosphere. The booth encloses a series of spray guns which are directed at the conduit at various angles as it moves through the booth. A continuous supply of pure graded zinc powder is drawn to the guns by air suction. The procedure used consists in feeding the zinc in the form of a fine powder into the spray guns where at a certain point it comes into the reducing zone of a conical flame of oxygen and natural gas and is melted. The flame is surrounded by a strong current of air under about 50 lbs. pressure which projects the melted zinc in an atomized spray against the exterior of the revolving conduit to form the metallized zinc surface 12.

The conduit is then conveyed from the zinc spraying booth to a location where the interior corrosion-resistant coating 13 is applied.

Since the primary purpose of the interior coating is to provide corrosion protection, organic resinous coating materials in general are satisfactory for this purpose. For example, the various commercial lacquers, varnishes, shellacs, phenol formaldehyde coatings, vinyl resins, and alkyd resins are entirely satisfactory. A melamine modified alkyd resin has proved to be a preferred protective coating. Such a coating contains an alkyd resin such as an oil modified glycerol phthalate resin containing about 40% phthalic anhydride and a melamine resin such as a butylated melamine formaldehyde resin of the type commonly used for speeding the cure and hardening of alkyd coatings. The alkyd-melamine ratio is about 5:1 by weight. These resins are dissolved in organic solvents such as xylene and mineral spirits to which a small amount of butyl alcohol, tinting material, and drying catalyst has been added. In order to lower the surface friction and harden the coating it is also desirable to add a small quantity of petrolatum. From the above description those skilled in the art will recognize that satisfactory results could be achieved with a large number of varying formulations. A typical formulation which has proved very satisfactory is given below, the percentages being given by weight:

|  | Percent |
|---|---|
| Alkyd resin | 25.90 |
| Xylene | 30.63 |
| Mineral spirits (boiling point 96°–190° C.) | 30.07 |
| Melamine resin | 4.30 |
| Butyl alcohol | 1.07 |
| Iron blue tint paste | 6.26 |
| Lampblack tint paste | 1.10 |
| Petrolatum | 0.58 |
| 6% cobalt naphthenate drier | 0.09 |
|  | 100 |

The interior coating 13 is applied internally by a spraying method as the pipe is rotated and it produces a smooth interior surface for the conduit that minimizes friction and allows the wires to slide easily therein.

After this operation the conduit rolls in a close file through another booth for electrostatically atomizing and spraying the outer coating over the exterior zinc surface as the conduit moves through the booth. The conduit is being continuously rotated on conveyor chains to insure a uniform coating over the entire outer surface. This outer surface 14 is a protective resin coating having minute particles of a corrosion-resistant metal suspended therein.

As in the case of the interior coating the resin component of the exterior coating may be composed of any of the typical commercial varieties of organic resinous coating materials such as lacquer, varnish, shellac, phenol formaldehyde, vinyl resins and alkyd resins. Corrosion-resistant metals such as aluminum and zinc in powder form are satisfactory for suspension in the organic coating materials. Of the materials described above I prefer to use a modified alkyd resin having aluminum powder suspended therein.

In the case of both the interior and exterior coatings it is desirable that the solvent and resin content be correlated with the best curing cycle. Those skilled in the art are accustomed to varying formulations in order to provide coatings best suited to particular curing cycles. Since it is possible to cure both the interior and exterior coating at the same time it is desirable that both coatings have the same curing cycle. The specific formula given above for the interior coating can be cured by a seven-minute treatment at 300° F. A specific alkyd resin-aluminum formulation for an exterior coating having the same curing cycle is given below, the percentages being in terms of weight:

|  | Percent |
|---|---|
| Non-leafing aluminum paste | 3.74 |
| Dipentene | 3.00 |
| Butyl alcohol | 1.40 |
| Mineral spirits (boiling point 96°–190° C.) | 27.29 |
| Modifying resin | 11.26 |
| Petrolatum | 0.58 |
| Alkyd solution | 37.44 |
| Urea formaldehyde solution | 15.00 |
| 6% cobalt naphthenate drier | 0.20 |
| 6% manganese naphthenate drier | 0.09 |
|  | 100 |

The modifying resin is produced by the polymerization of materials of hydrocarbon origin soluble in aliphatic hydrocarbons. The alkyd solution is a 50% solids solution in an aliphatic hydrocarbon solvent of a rosin and oil modified glycerol phthalate containing 20% phthalic anhydride and 30% drying oil acids. The urea formaldehyde solution is a well butylated urea formaldehyde resin. This provides a wide range of compatibility with and tolerance for aliphatic solvents. Melamine formaldehyde resins are also satisfactory for this purpose.

After the application of the coatings the conduit moves into, and slowly rotates through, a baking oven where both the interior and exterior coatings are cured. After the conduit cools, couplings and thread protectors are assembled on its ends and the conduit is ready to be stacked and shipped.

At the present time, four generally accepted methods of applying a galvanized zinc coating are known: (1) by sherardizing; (2) by the hot-dip process; (3) by electroplating; and (4) metallizing.

The sherardizing process applies the zinc by cementation and consists in packing the cleaned and pickled (or sand blasted) pipes in drums which are nearly filled with zinc dust. The drums are rotated at a slow speed in a furnace at a temperature ranging from 600° F. to 750° F. and then slowly cooled. Another name for this process is drum galvanizing.

The hot-dip process is, as the name implies, a method of coating steel pipes by immersing them or dipping them in a bath of molten zinc. The hot-dip galvanizing plant usually consists of suitable pickling and washing tanks, facilities for the application of flux, and steel galvanizing kettles carrying a large mass of molten zinc at a temperature somewhat above the melting point or from about 810° F. to 875° F.

The electroplating process for applying zinc to iron or steel consists in making the pipe to be plated the cathode either in an electrolyte of an acid bath of zinc sulfate, or in an alkaline zinc cyanide solution. Current is applied to the electrolyte through the anodes suspended in the electrolyte and a zinc coating is applied to the exterior of the pipe.

The zinc coating applied by a metallizing process which is practiced in the present invention is, as was discussed above, in a fine graded powder state before it is applied by spraying, and it retains some of its granular structure after it is deposited on the conduit as can clearly be seen in Figure 6 of the drawing. Looking at Figures 3 through 5, the other types of galvanized conduit have the zinc applied in more uniform deposits. This granular formation of the metallized conduit crumbles somewhat when a threading die is twisted over the end of the conduit. As the zinc particles crumble and fall into the path of the cutters of the die, a lubricant is provided for the die by the substantially pure zinc powder. The pure zinc not only acts as a thread lubricant but it also fills up irregularities in the thread and assists in making a tight joint. Threaded specimens of metallized conduit may be identified by the naked eye out of a group including specimens of conduits made by the hot-dip method, the sherardizing method and the electroplating method because the threads on the metallized conduit are clean with a smooth, bright finish, while specimens of conduit made by the other methods are characterized by rough threads having a dull and relatively irregular finish. Zinc powder has in the past been mixed with the well-known thread lubricants to provide a superior lubricating means for cutting threads while also filling up irregularities in the threads and thereby assisting in making a tight joint. With a metallized zinc conduit, however, the zinc powder is built into the conduit so that when the threads are cut the zinc powder is rendered available to lubricate the threading die. As can be seen in the accompanying photomicrographs, the zinc coatings on the other conduits are not granular in nature which fact distinguishes the metallized conduit from the other three types of conduit.

The organic resin exterior coating 14 further contributes to the increased ease of thread cutting of the metallized conduit because the coating 14 contains a certain amount of metal powder which combines with the loose grains of pure zinc to act as a metallic lubricant of zinc and the metal powder. It is known that aluminum in many forms has been used in lubricants for enhancing the lubricating characteristics and it is particularly suitable for this purpose. Therefore, the electrical conduit of the present invention in which aluminum is used as the powdered metal has the advantages over conduit made by the other known methods of prolonging the useful life of threading dies used in threading the conduit as well as presenting less resistance or friction to the threading of the conduit because of the lubricating ability of the aluminum combined with the zinc powder. Cleaner and more perfect threads may also be formed on metallized conduit and therefore a tighter joint may be formed between the couplings and the conduit which is a decided advantage in wet locations. The metal particles in the outer organic coating also retain and protect for the conduit the metallic coloring of the zinc finish. Without this outer coating, the zinc would become easily marked or blemished during handling or transit, which obviously would be objectionable from the customers' stand-point.

It should be clearly understood that the combined metal powder and zinc dust for lubricating the threading dies does not entirely eliminate the necessity for using a thread-cutting oil over the ends of the conduit before the threads are chased thereon. However, in the case of the metallized surface as seen in Figure 6, minute pores are formed which store a large percentage of the cutting oil. It is important to note that in the photomicrograph of Figure 6 the outer organic coating which includes the metal powder has not been applied to the specimen of conduit. The reason for this is that the specimens of conduit are molded in a plastic disk under heat and pressure and the mold must be polished before it can be photographed. If the outer coating 14 of the metallized conduit were present on the specimen then the polishing operation would smear the coating over the mold and thereby render the mold useless for photographic purposes.

The point to be made here is that the outer coating 14 mechanically saturates approximately two-thirds the depth of the structure of the zinc coating because of the porous nature of the zinc when applied in powder form by a metallizing process. The outer coating, however, does not smooth out the porosity of the zinc entirely but leaves about one-third of the coating porous. This surface roughness or porosity still retains a great deal of the cutting oil on the surface of the conduit while it is being threaded. Another feature contributing to the ease of thread cutting is the use of a crushed steel grit in blasting the exterior of the conduit before it is metallized. This removes the hard surface scale of the conduit acquired during the processing of the pipe in the steel mill as well as during the tumbling of the pipe in the pickling operation. In the other methods of making conduit, the surface hardness acquired during steel mill processing is not removed. By using the metallizing process, a softer skinned steel conduit is produced which also assists in producing an easier threading rigid conduit as well as a more ductile conduit which makes bending easier.

In summarizing, persons skilled in this art will appreciate that I have provided an electrical rigid conduit which is easier to thread than other known types of conduit because of the lubricating characteristics of the zinc powder from the metallized exterior surface and the metal powder found in the outer organic coating. It is not only easier to thread this conduit, but when threaded, the quality of the threads is much higher than on conduit made by the other known methods. The conduit is also more ductile because of the grit blasting operation which removes the thin surface hardness which is present on other types of galvanized conduit. Since the conduit is more ductile it is easier to bend which is an important consideration from the electrician's viewpoint. The inner organic coating provides a smooth interior surface that minimizes friction and saves time in wire-pulling. The surface coatings of the conduit not only add to the usefulness of the conduit but they also add to the longevity of the conduit from a corrosion standpoint.

Modifications of this invention will occur to those skilled in the art, and it is to be understood, therefore, that this invention is not limited to the particular embodiment disclosed but that it is intended to cover all modifications which are in the true spirit and scope of this invention.

What I claim as new and desire to secure by Letters Patent of the United States is:

1. A steel conduit having an outer surface covered by a built-in thread lubricant comprising a continuous layer of sprayed zinc particles coated with the modified alkyd resin having suspended therein an aluminum powder, the particles of zinc and aluminum which are dislodged when cutting threads on the conduit serving to lubricate the threading dies and fill up the small irregularities in the thread surfaces.

2. An electrical steel conduit having a grit blasted outer surface that is covered by a built-in thread lubricant comprising a continuous layer of metallized zinc of a highly porous nature coated with a modified alkyd resin having aluminum powder suspended therein, the resulting porous outer surface of the conduit serving to retain a large percentage of the cutting oil which is applied to the end of the conduit just prior to the cutting of the threads.

3. An electrical steel conduit having a roughened outer surface that is covered by a corrosion resistant jacket that also serves as a thread lubricant, said jacket comprising a continuous layer of sprayed zinc powder of a highly granular nature covered with a modified alkyd resin having an aluminum powder suspended therein, both the zinc and aluminum powders being available as a lubricant when threads are being cut on the conduit.

References Cited in the file of this patent

UNITED STATES PATENTS

| | | |
|---|---|---|
| 951,580 | Robinson | Mar. 8, 1910 |
| 1,088,963 | Buck | Mar. 3, 1914 |
| 1,254,344 | Murphy | Jan. 22, 1918 |
| 2,355,756 | Smith | Aug. 15, 1944 |
| 2,683,436 | Marantz | July 13, 1954 |